United States Patent
McIntyre et al.

(10) Patent No.: US 6,543,632 B1
(45) Date of Patent: Apr. 8, 2003

(54) FEEDER BOTTLES

(75) Inventors: Robert Dimock McIntyre, Hunterville (NZ); Robin Whitfield, Palmerston North (NZ); Rex Alan Pike, Masterton (NZ)

(73) Assignee: Robert Dymock McIntyre, Hunterville (NZ)

( * ) Notice: Subject to any disclaimer, the term of this patent is extended or adjusted under 35 U.S.C. 154(b) by 0 days.

(21) Appl. No.: 09/913,289

(22) PCT Filed: Feb. 10, 2000

(86) PCT No.: PCT/NZ00/00008

§ 371 (c)(1),
(2), (4) Date: Aug. 13, 2001

(87) PCT Pub. No.: WO00/47162

PCT Pub. Date: Aug. 17, 2000

(30) Foreign Application Priority Data

Feb. 12, 1999  (NZ) ................................................ 334176

(51) Int. Cl.[7] .............................. A61J 9/04; A61K 9/00
(52) U.S. Cl. ........................................ 215/11.5; 119/72
(58) Field of Search ............................ 119/72, 72.5, 71; 215/11.5, 11.1, 11.4, 11.6

(56) References Cited

U.S. PATENT DOCUMENTS

| 484,811 A | * | 10/1892 | Newell ........................ 215/11.5 |
| 845,981 A | * | 3/1907 | Singer ........................ 215/11.5 |
| 1,441,406 A | * | 1/1923 | Dales ......................... 215/11.5 |
| 2,321,236 A | * | 6/1943 | Parkin ....................... 137/512.1 |
| 2,379,562 A | * | 7/1945 | Boxley ....................... 215/11.5 |
| 2,672,124 A | * | 3/1954 | McCrary ...................... 119/71 |
| 3,292,808 A | * | 12/1966 | Greene ........................ 137/843 |

FOREIGN PATENT DOCUMENTS

| FR | 652524 A | * | 3/1929 |
| WO | WO 98/31323 A1 | * | 7/1998 |

* cited by examiner

Primary Examiner—Michael J. Carone
Assistant Examiner—John W. Zerr
(74) Attorney, Agent, or Firm—Young & Thompson

(57) ABSTRACT

A device (10) for use in increasing milk flow from a feeder bottle (B). The device (10) includes a shaft (11) adapted for entry into a correspondingly shaped hole (H) in the feeder bottle (B). The device further includes a retention element for retaining the device in the hole (H) and a channel element (13), formed in a wall of the shaft (11). The shaft element (11) is movable such that it can, in a first position, seal the hole (H) closed and, in another position (illustrated), permit airflow into the feeder bottle (B) via the channel element (13).

19 Claims, 2 Drawing Sheets

FEEDER BOTTLES

BACKGROUND TO THE INVENTION

The present invention relates to improvements in feeder bottles but more particularly a device for increasing flow from a bottle.

In the course of animal rearing, particularly the rearing of calves, a bottle is often used for feeding which includes a teat similar to that of a cow.

A common problem encountered is that standard teats can produce only slow liquid flow when used with a bottle. This is especially a problem when nursing a very young or sick calf which requires a high liquid intake. The bottle must be squeezed to substantially increase flow.

The most common method for overcoming this flow problem is simply to cut off the end of the teat. The flow from the bottle is substantially increased, however, the teat is now damaged beyond repair and can no longer perform its normal operation of regulating flow to the animal to correspond with the milk flow of its mother. Quality teat feeder designs can be relatively expensive and so it is not desirable to destroy them by cutting off the tip.

SUMMARY OF THE INVENTION

It is therefore an object of the present invention to provide a construction whereby flow through a feeder bottle can be increased without damaging the teat.

In one broad aspect of the invention there is provided a venting device for use in increasing flow from a feeding bottle, the device including an elongate shaft having a distal end which in use is engageable through an opening in the feeding bottle, a retention part associated with the distal end to in use retain the distal end within the bottle, and a channel, the shaft further including a sealing portion and a finger grippable portion whereby in use the shaft can be moved longitudinally from a sealing position, where the sealing portion sealingly engages in the opening, to a venting position where the channel establishes a clearance between the opening and the shaft for venting of the feeding bottle.

DETAILED DESCRIPTION OF A PREFERRED EMBODIMENT OF THE INVENTION

The present invention is hereinafter described by reference to a flow increasing device for an animal feeder bottle, however, it will be appreciated by those skilled in the art that many more applications of the device will be possible without departing from the scope and spirit of the invention as it is intended.

Figure 1:
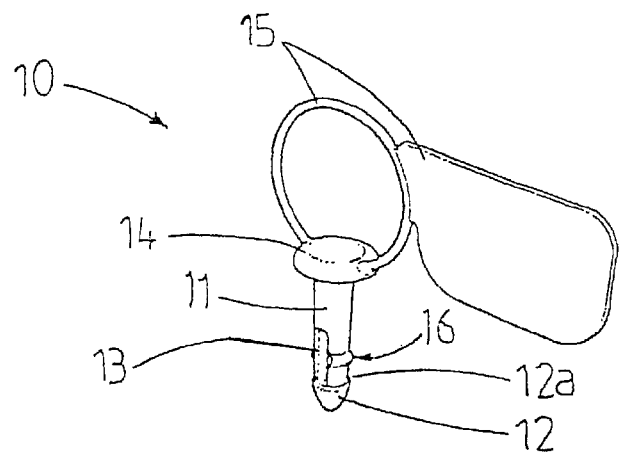
FIG. 1 is a general view of the device according to the present invention.

The overall best view of the flow increasing device 10 is shown by FIG. 1. Device 10 is principally comprised of (in this preferred embodiment) a shaft 11 with a wall surface which is slightly tapered outward from a head 12 located at one end of the shaft 11 as seen in FIG. 1. The cross-sectional diameter of head 12 is greater than the cross-sectional diameter at any point of tapered shaft 11. This bulbous head 12 provides a retention or non-return action when the device is inserted head end first into a feeder bottle as is described below.

A surface channel 13 is formed in the wall of shaft 11, the channel preferably extending from (and into) the head 12 to at least a half-way point on shaft 11. The depth of channel 13 is preferably at least a quarter of the diameter of shaft 11, however, future embodiments may provide for a slot extending through the entire width of shaft 11.

A handling means in the form of a domed cap 14 is located at the widened (by virtue of the taper) end of the shaft 11. Domed cap 14 includes a ring and tag construction 15 which provides a finger hold for moving shaft 11 relative to a hole formed in a bottle as hereinafter described.

In order to aid device 10 to remain in a "withdrawn" position on a feeder bottle, there is provided a radially widened section 16 upon shaft 11. Widened section 16 is located approximately 5 mm up the shaft 11 from head 12. Preferably, the widening of section 16 will not form a diameter greater than the head 12.

Without the inclusion of section 16 it has been found that the device 10 can slip back into the bottle when it is required to remain withdrawn (for greater flow of liquid).

Figure 2:
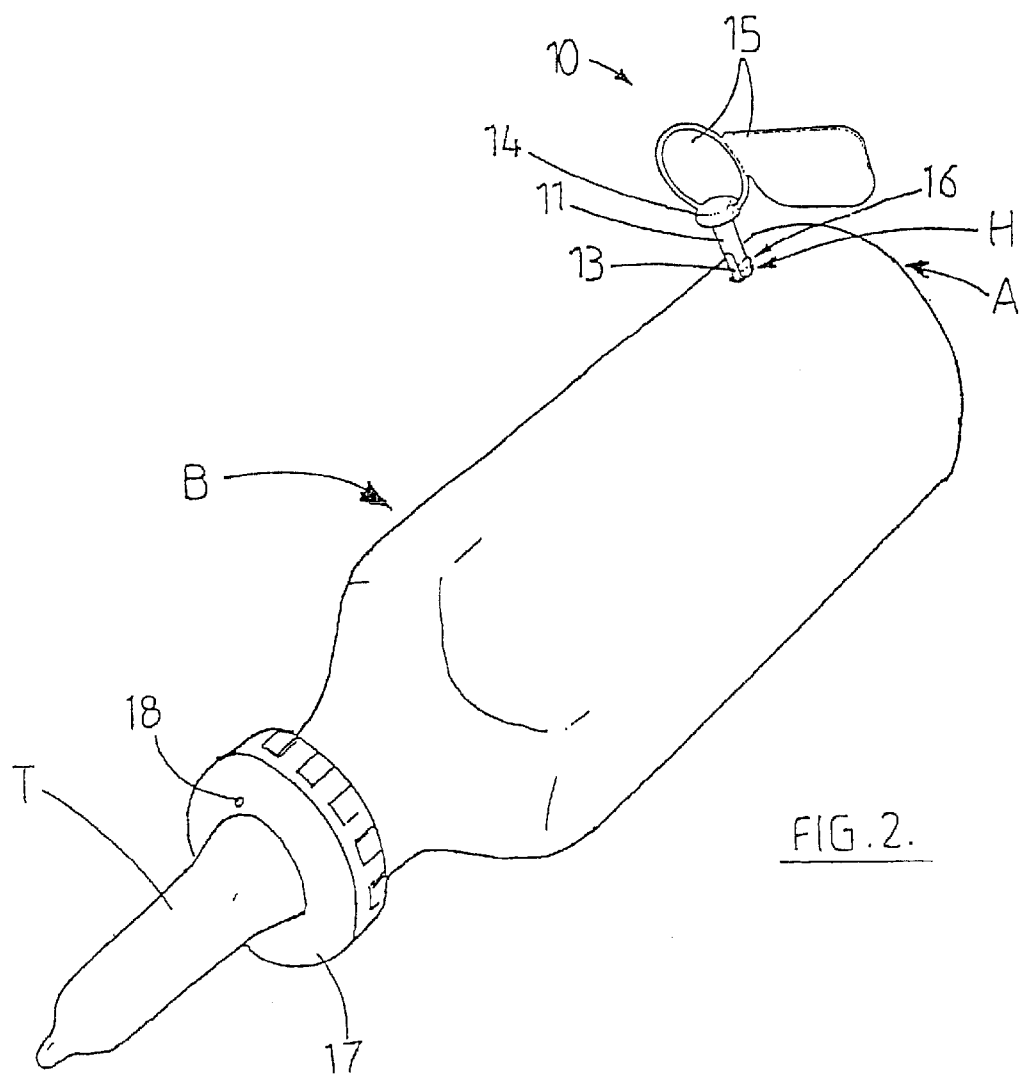
FIG. 2 is a general view of an animal feeder bottle modified to include a device according to the present invention.

FIG. 2 illustrates the device 10 as it would be fitted to a standard feeder bottle B with teat T.

The first operation required is the forming of a hole H into the (generally plastic) bottle B at a point adjacent its base A. It is intended that a sharp nail with a diameter substantially equal to that of the shaft 11 where it joins to head 12 (denoted by 12a in FIG. 1) be used to form a suitable opening. This operation can be performed in the field by a user of the bottle. However, it is preferred that the bottle B be provided with the hole H already bored (by drilling etc) to avoid the user making the hole H an incorrect size (leading to substandard performance etc).

In the illustrated embodiment the hole H is formed substantially adjacent base A. It is possible to form hole H anywhere on bottle B, including on base A itself, however, it has been found preferable to form the hole (H) near the base A as illustrated to ensure the back pressure is released during feeding.

When hole H is formed, bottle B is ready for "increased flow" use according to the present invention. Head 12, radially widened section 16 and shaft 11 of device 10 may be inserted into hole H by a degree of force. Once inserted the device 10 is retained in the hole H by virtue of a shoulder formed by the differential in diameter denoted by 12a of FIG. 1 between head 12 and shaft 11.

For filling, the device 10 is pushed fully into hole H in bottle B and by virtue of the tapered shaft 11, the hole H is sealed. During filling, storage or transport only the cap 14 and tag 15 is visible.

When in use the ring/tag 15 may be pulled by a finger (not shown) to withdraw the shaft 11. Device 10 is prevented from complete removal by virtue of head 12 and is held in withdrawn position by virtue of widened section 16 preventing device 10 slipping back into hole H. Effectively the wall of the bottle B is retained between the radially widened section 16 and head 12. When withdrawn for use (as illustrated by FIG. 2) the channel 13 creates an air bridge (or vent) between the inside and outside of bottle B and removes the back pressure created within a sealed bottle B during feeding. This removal of back pressure dramatically increases the flow rate out of teat T without cutting an end off teat T as was previously the case.

The present invention therefore provides a device able to be retrofitted to existing feeder bottle designs to provide variable flow control. Alternatively, a specialised bottle may be provided with a device according to the present invention, including a hole H formed at the preferred/optimum position and to the correct dimensions.

Effectively the device 10, when "pushed in" to the bottle wall, allows normal use of the teat T (which means no flow at all unless a calf is sucking on it). When device 10 is "pulled out" as illustrated the bottle is enabled for "fast feeding" for, say, young or sick calves.

It is intended that text to the effect of "pull out for young and sick calves" and "push in for transport/normal use" be incorporated into the tag 15.

The most practical method of manufacture for device 10 is injection moulding from thermoplastic. The device may be produced in a range of colours or to match the colour of an artificial teat with which it is intended to be sold.

The device for increasing flow from a bottle of the present invention is thus a simple to use construction which effectively increases the flow through a feeder bottle without the need to damage the teats.

Figure 3:
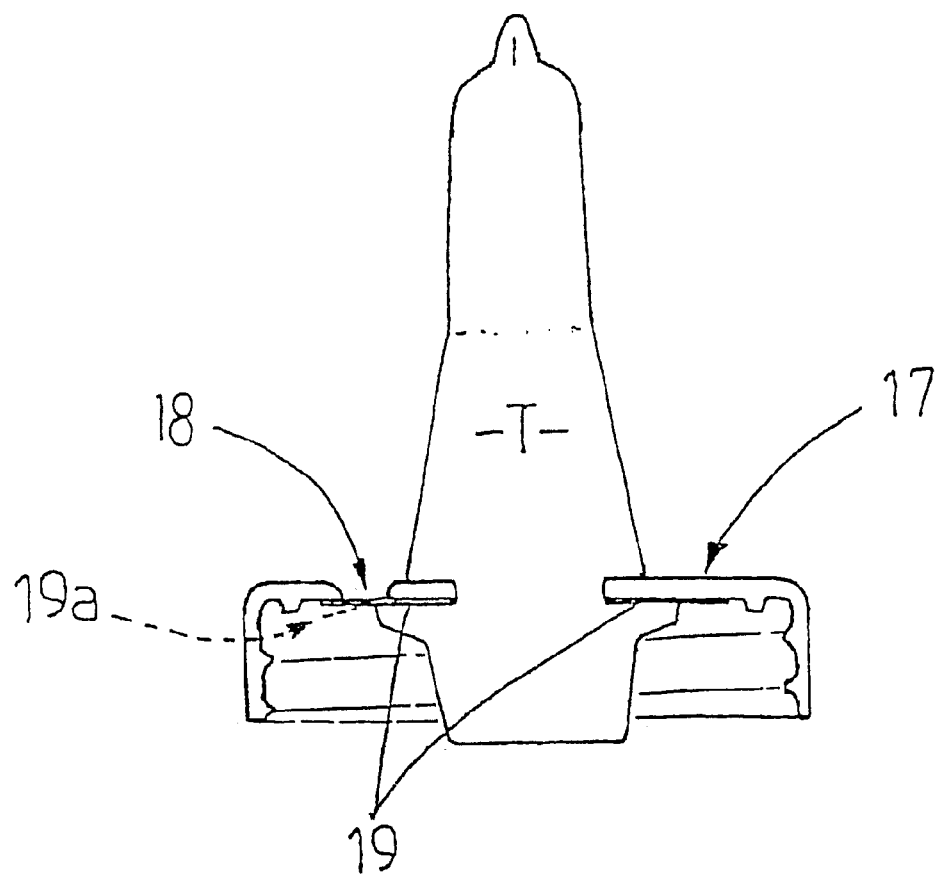
FIG. 3 is a cross section view of a lid as used with a device of the present invention.

FIG. 3 shows a cross section of the lid and teat as may be used in conjunction with the device 10 of the present invention.

Lid 17 is formed with a breather hole 18 which allows air into the bottle when it is being used either without a device 10 installed or when device 10 is "pushed-in" to the bottle wall (ie. sealed).

The flow of liquid out of the bottle B will be slow (normal) when device 10 is pushed in, however, only very limited flow will be possible without the provision of breather hole 18.

As illustrated in FIG. 3 breather hole 18 is provided with a membrane 19 which is positioned about the periphery of the inner teat T and covers breather hole 18. Membrane 19 is not formed integrally with lid 17 and is preferably a separate ring element of strong but flexible material which allows it to move away from the lid surface 17 and let in air when the teat T is in use. The flexibility in use is shown exaggerated in dotted detail 19a by FIG. 3.

The general construction of the device 10 according to the present invention may be used in conjunction with other containment means, eg. oil or gasoline cans where the same problem regarding back pressure due to a thin exit aperture is experienced.

What is claimed is:

1. A feeding bottle including a hole formed in said bottle and a venting device, said venting device including an elongate shaft longitudinally inserted in the hole, the elongate shaft having a distal end which in use is located within the feeding bottle, a retention part associated with the distal end to retain the distal end within the bottle, and a channel, the shaft further including a sealing portion and a finger grippable portion, said shaft being moveable longitudinally from a sealing position, where the sealing portion sealingly contacts a perimeter of the hole, to a venting position where the channel establishes a clearance between the hole and the shaft for venting the bottle.

2. The feeding bottle according to claim 1 wherein the hole is formed adjacent to or on a base of the bottle.

3. The feeding bottle of claim 2 wherein the venting device is formed from a coloured plastic corresponding to the colour of a feeding nipple mounted to the bottle.

4. A feeding bottle as claimed in claim 1 including a mounting for an animal feeding nipple, said lid having a breather hole and a thin membrane releasably covers said breather hole.

5. The feeding bottle of claim 4 wherein the membrane is formed in a ring shape of substantially flexible material such that, in use, air may pass into the feeding bottle while a liquid is leaving the bottle via the feeding nipple.

6. The feeding bottle of claim 1 wherein the shaft further includes a stop to prevent the shaft from freely reverting from the venting position to said sealing position.

7. The feeding bottle of claim 6 wherein the stop is formed by a radially widened section spaced apart from the retention part, and the channel intersects the radially widened section.

8. The feeding bottle of claim 7, wherein the retention part comprises a tapered head at the distal end, the head defining a shoulder which is of greater cross-sectional area than that of the hole.

9. The feeding bottle of claim 7 wherein the channel extends longitudinally from the retention part to beyond the stop but terminates before the sealing portion.

10. The feeding bottle of claim 9, wherein the hole is circular and the sealing portion of the shaft is of a diameter greater than that of the hole.

11. The feeding bottle of claim 10 wherein the shaft is tapered outward from the retention part.

12. The feeding bottle of claim 8 wherein the largest cross-sectional dimension of the retention part is greater than the largest cross-sectional dimension of the shaft.

13. The feeding bottle of claim 1 wherein the finger grippable portion is a domed cap.

14. The feeding bottle of claim 1 wherein the finger grippable part includes a ring for receiving a finger of a user.

15. The feeding bottle of claim 1 wherein the finger grippable part includes a tag.

16. The feeding bottle of claim 15 wherein the tag provides printed or pictorial instructional information pertaining to use of the device.

17. The feeding bottle of claim 1 wherein the venting device is manufactured in one piece from a plastic material.

18. A feeding bottle having a venting hole, said bottle comprising:

a venting device for insertion into said hole, said venting device comprising:

an elongate shaft having first and second ends;

a head, said first end terminating at said head;

an elongate channel in an outer wall of said elongate shaft terminating at said head; and a sealing portion at the second end for sealing the bottle, wherein said elongate shaft is longitudinally moveable from a first position where said sealing portion contacts a perimeter of the venting hole, to a second position where the channel establishes a clearance between the venting hole and the shaft so that air is moveable both into and out of the bottle through the channel.

19. A feeding bottle having a venting hole, said bottle comprising:

a venting device for insertion into said hole, said venting device comprising:

an elongate shaft having first and second ends;

a head, said first end terminating at said head;

an elongate channel in said elongate shaft terminating at said head;

a sealing portion at the second end for sealing the bottle; and a stop on said shaft nearer to said first end than said second end, wherein said elongate shaft is moveable from a first position where said sealing portion contacts a perimeter of the venting hole to a second position where the stop contacts a perimeter of the venting hole.

* * * * *